United States Patent
Tazumi et al.

(10) Patent No.: US 10,308,747 B2
(45) Date of Patent: Jun. 4, 2019

(54) MODIFIED POLYPROPYLENE-BASED RESIN, POLYPROPYLENE-BASED RESIN EXPANDED SHEET, EXPANDED RESIN-MADE CONTAINER, AND METHOD FOR PRODUCING MODIFIED POLYPROPYLENE-BASED RESIN

(71) Applicant: SEKISUI PLASTICS CO., LTD., Osaka (JP)

(72) Inventors: Kohei Tazumi, Nara (JP); Eiji Fukuyama, Nara (JP); Michihiro Hayashi, Nara (JP); Shota Endo, Nara (JP); Masashi Yamashita, Nara (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 0 days.

(21) Appl. No.: 15/500,676

(22) PCT Filed: Sep. 29, 2015

(86) PCT No.: PCT/JP2015/077506
§ 371 (c)(1),
(2) Date: Jan. 31, 2017

(87) PCT Pub. No.: WO2016/067814
PCT Pub. Date: May 6, 2016

(65) Prior Publication Data
US 2017/0218109 A1 Aug. 3, 2017

(30) Foreign Application Priority Data

Oct. 30, 2014 (JP) .................................. 2014-221005
Mar. 26, 2015 (JP) .................................. 2015-064828

(51) Int. Cl.
*C08F 255/02* (2006.01)
*C08J 9/14* (2006.01)
*C08L 51/06* (2006.01)
*C08J 9/00* (2006.01)

(52) U.S. Cl.
CPC .......... *C08F 255/02* (2013.01); *C08J 9/0061* (2013.01); *C08L 51/06* (2013.01); *C08J 9/14* (2013.01); *C08J 9/141* (2013.01); *C08J 2201/03* (2013.01); *C08J 2203/14* (2013.01); *C08J 2205/052* (2013.01); *C08J 2323/12* (2013.01); *C08J 2351/06* (2013.01); *C08J 2423/12* (2013.01); *C08J 2451/06* (2013.01)

(58) Field of Classification Search
CPC .... C08F 255/02; C08J 9/0061; C08J 2201/03; C08J 2203/14; C08J 2205/052; C08J 2323/12; C08J 2351/06; C08J 2423/12; C08J 2451/06; C08J 9/14; C08J 9/141; C08J 2351/12; C08L 23/12; C08L 51/06
See application file for complete search history.

(56) References Cited

U.S. PATENT DOCUMENTS 5,116,881 A * 5/1992 Park .......................... C08J 9/12
264/321
6,077,878 A 6/2000 Okura et al.
2009/0274890 A1 11/2009 Ishida et al.

FOREIGN PATENT DOCUMENTS

| EP | 0841354 | 5/1998 |
|---|---|---|
| JP | H09-95550 A | 4/1997 |
| JP | H09-188728 A | 7/1997 |
| JP | H10-81775 A | 3/1998 |
| JP | H10-130416 A | 5/1998 |
| JP | H10-306171 A | 11/1998 |
| JP | 2000-273232 A | 10/2000 |
| JP | 2011-58008 A | 3/2011 |
| KR | 1999-0028662 | 4/1999 |

OTHER PUBLICATIONS

International Preliminary Report on Patentability from PCT/JP2015/077506, dated May 2, 2017, 13 pages.
International Search Report issued in Japan Patent Application No. PCT/JP2015/077506, dated Dec. 15, 2015.
Official Communication issued in European Patent Office (EPO) Patent Application No. 15853828.0, dated Jun. 1, 2018.

* cited by examiner

*Primary Examiner* — Irina S Zemel
(74) *Attorney, Agent, or Firm* — Greenblum & Bernstein, P.L.C.

(57) ABSTRACT

To obtain a modified polypropylene-based resin which shows specific viscoelasticity and from which an expanded sheet having a low open cell ratio can be obtained.

7 Claims, No Drawings

MODIFIED POLYPROPYLENE-BASED RESIN, POLYPROPYLENE-BASED RESIN EXPANDED SHEET, EXPANDED RESIN-MADE CONTAINER, AND METHOD FOR PRODUCING MODIFIED POLYPROPYLENE-BASED RESIN

CROSS-REFERENCE TO RELATED APPLICATIONS

The present application claims the priorities based on Japanese Patent Application No. 2014-221005 and Japanese Patent Application No. 2015-064828, which are incorporated herein by reference.

TECHNICAL FIELD

The present invention relates to a modified polypropylene-based resin obtained by modifying a polypropylene-based resin, a polypropylene-based resin expand sheet, and a method for producing a modified polypropylene-based resin to prepare a modified polypropylene-based resin.

BACKGROUND TECHNOLOGY

In the past, since a polypropylene-based resin is excellent in mechanical nature, chemical resistance, and the like, it has been utilized as a raw material of a variety of molded articles.

A molded article constituted of the polypropylene-based resin is generally prepared by extrusion molding, blow molding, expanding molding, or the like.

Since the polypropylene-based resin has generally crystallinity, the viscosity and melt tension at melting thereof are low.

For this reason, particularly when one tries to obtain an expanded molded article or the like constituted of the polypropylene-based resin, there is a problem that it is difficult to obtain an expanded sheet having a low open cell ratio.

In order to solve such a problem, adjustment of the melt properties by modifying the polypropylene-based resin with an aromatic vinyl monomer such as a styrene monomer has been studied.

Meanwhile, when a strain amount to be added to a polymer in the molten state per unit time is increased to measure the elongation viscosity, in general polymers, an approximately linear relationship is shown between a value of the strain amount and a value of the elongation viscosity.

On the other hand, specific polymers show nature that the elongation viscosity is rapidly increased from a certain strain amount.

Such nature is named as "strain hardening property" or the like.

The following Patent Document 1 describes a method of obtaining a modified polypropylene-based resin having "strain hardening property".

In this Patent Document 1, in Examples or the like, there is described that, by reacting 10 parts by mass or more of a styrene monomer with 100 parts by mass of a polypropylene-based resin, strain hardening property which was not exerted only by a reaction of 2 parts by mass of a styrene monomer is exerted, and a rod-shaped foam is obtained in the good expanded state.

PRIOR ART DOCUMENTS

Patent Documents

Patent Document 1: Japanese Unexamined Patent Application, First Publication No. Hei9-188728

SUMMARY OF THE INVENTION

Problem to be Solved by the Invention

In the polypropylene-based resin to which excellent strain hardening property has been imparted by modification, when cells rapidly grow in expanding molding or the like, rupture of a membrane due to rapid elongation of the cell membrane is prevented, and it is considered that such a polypropylene-based resin is advantageous in forming an expanded molded article having a low open cell ratio.

However, in the past, even when the modified polypropylene-based resin excellent in strain hardening property is used, it may have been difficult to obtain an expanded molded article having a low open cell ratio.

This is due to that a modified resin shows strain hardening property, but it has not become to show specific viscoelasticity.

Such a problem has become remarkable when an expanded sheet is produced by extrusion expansion from a circular die or the like, as compared with the case where a rod-shaped expanded molded article or a board-shaped expanded molded article is subjected to extrusion expansion using a sizing die.

In production of an expanded molded article, particularly an expanded sheet, even when the modified polypropylene-based resin excellent in strain hardening property is used in formation thereof, since it has become difficult to prepare an expanded sheet having a low open cell ratio, strategy therefor is strongly demanded, but such strategy has not been established yet.

An object of the present invention is to satisfy such demand, and is to provide a modified polypropylene-based resin from which an expanded sheet having a low open cell ratio can be easily obtained.

Means for Solving the Problem

The present inventors intensively studied to solve the above-mentioned problems, and found out that a modified polypropylene-based resin showing specific viscoelasticity when a relatively mild strain is imparted is suitable for obtaining an expanded sheet having a low open cell ratio.

That is, a modified polypropylene-based resin according to the present invention for solving the above-mentioned problems is obtained by reacting a polypropylene-based resin with an aromatic vinyl monomer, and the modified polypropylene-based resin has a phase angle determined with a frequency dispersion dynamic viscoelasticity measurement at 200° C. of 300 or more and 70° or less at a frequency of 0.01 Hz.

Additionally, a polypropylene-based resin expanded sheet according to the present invention comprises a modified polypropylene-based resin obtained by reacting a polypropylene-based resin with an aromatic vinyl monomer, and the modified polypropylene-based resin has a phase angle determined with a frequency dispersion dynamic viscoelasticity measurement at 200° C. of 300 or more and 70° or less at a frequency of 0.01 Hz.

An expanded resin-made container according to the present invention is obtained by thermally molding such a polypropylene-based resin expanded sheet.

Further, a method for producing a modified polypropylene-based resin according to the present invention is a method for producing a modified polypropylene-based resin by reacting a polypropylene-based resin with an aromatic vinyl monomer to produce a modified polypropylene-based resin, the method comprising melt-kneading a resin composition including a polypropylene-based resin, an organic peroxide, and an aromatic vinyl monomer to prepare a modified polypropylene-based resin having a phase angle determined with a frequency dispersion dynamic viscoelasticity measurement at 200° C. of 30° or more and 70° or less at a frequency of 0.01 Hz, in which the resin composition to be subjected to the melt-kneading contains 0.1 parts by mass or more and 1.5 parts by mass or less of the organic peroxide based on 100 parts by mass of the polypropylene-based resin, and contains 0.1 parts by mass or more and 10 parts by mass or less of the aromatic vinyl monomer based on 100 parts by mass of the polypropylene-based resin.

Effects of Invention

In accordance with the present invention, a modified polypropylene-based resin suitable for expansion can be obtained, and an expanded sheet having a low open cell ratio can be easily obtained.

BEST MODE FOR CARRYING OUT THE INVENTION

Embodiments of the present invention will be explained.
(Modified Polypropylene-Based Resin)

In the modified polypropylene-based resin of the present embodiment, a phase angle determined with a frequency dispersion dynamic viscoelasticity measurement at 200° C. shows 30° or more and 70° or less at a frequency of 0.01 Hz.

In the frequency dispersion dynamic viscoelasticity measurement, influence of a viscosity item easily appears in a low frequency region.

That is, the modified polypropylene-based resin of the present embodiment has a small phase angle at a low frequency region, and hardly generates "shear" between molecules.

Accordingly, since the modified polypropylene-based resin of the present embodiment shows proper elongation when expanded in order to form an expanded sheet, and a cell membrane is suppressed from rapidly thinning with growth of cells, the resin has become advantageous for obtaining an expanded sheet having a low open cell ratio.

In addition, the phase angle is obtained by as follows.
(How to Obtain Phase Angle)

A dynamic elasticity measurement is performed with a viscoelasticity measuring device PHYSICA MCR301 (manufactured by Anton Paar) and a temperature controlling system CTD450.

First, the modified polypropylene-based resin as a sample is formed into a disc sample having a diameter of 25 mm and a thickness of 3 mm, with a heat pressing machine under the heating condition of temperature 200° C.×5 minutes.

Then, the sample is set on a plate of the viscoelasticity measuring device heated at a measurement temperature (200° C.), and is heated and melted over 5 minutes under the nitrogen atmosphere.

Thereafter, using parallel plates having a diameter of 25 mm, the sample is crushed until an interval of the parallel plates became 2.0 mm, to remove the modified polypropylene-based resin which has protruded from the plates.

Further, after a temperature reaches a measurement temperature±1° C., the sample is heated for 5 minutes, and dynamic viscoelasticity measurement is performed under the condition of a strain of 5%, a frequency of 0.01 to 100 (Hz), the number of measurement points of 21 (5 points/digit), and a measurement temperature of 200° C., to measure a phase angle δ (°).

In addition, the measurement is initiated from a high frequency side (100 Hz).

Then, a phase angle δ at a frequency of 0.01 Hz is obtained.

Such a modified polypropylene-based resin can be obtained by reacting a resin composition including (A) a polypropylene-based resin, (B) an organic peroxide, and (C) an aromatic vinyl monomer.

Particularly, the modified polypropylene-based resin of the present embodiment can be easily obtained by melt-kneading a resin composition containing the organic peroxide at 0.1 parts by mass or more and 1.5 parts by mass or less based on 100 parts by mass of the polypropylene-based resin, and the aromatic vinyl monomer at 0.1 parts by mass or more and 10 parts by mass or less based on 100 parts by mass of the polypropylene-based resin.

The modified polypropylene-based resin of the present embodiment is suitable for forming an expanded molded article having good appearance and excellent strength.

In the modified polypropylene-based resin of the present embodiment, when expanded, cell breakage is hardly generated in the interior thereof, and an expanded molded article of good appearance having a low open cell ratio can be obtained.

Additionally, the modified polypropylene-based resin of the present embodiment has an advantage that an expanded sheet having a low open cell ratio is easily obtained.

The resin composition used for obtaining the modified polypropylene-based resin of the present embodiment contains preferably "(D) a radical scavenger", and may contain "(E) other components" other than the (A) to (D) components.

Respective components used for obtaining the modified polypropylene-based resin of the present embodiment will be explained below.

[(A) Polypropylene-Based Resin]

The (A) polypropylene-based resin is a polymer obtained by polymerizing a propylene monomer.

In the present embodiment, one or more of a homopolymer of a propylene monomer and a copolymer containing a propylene monomer as a main component of a constituent unit can be contained, as the (A) polypropylene-based resin, in the resin composition.

In the copolymer, for example, the ratio of the propylene monomer to the constituent unit is preferably 50% by mass or more, the ratio of the propylene monomer is more preferably 80% by mass or more, and the ratio of the propylene monomer is particularly preferably 90% by mass or more.

The copolymer may be a random copolymer or a block copolymer.

When the polypropylene-based resin is a copolymer, a component other than the propylene monomer is preferably one or more of an ethylene monomer and an α-olefin monomer having 4 to 8 carbon atoms, and more preferably one or more of an ethylene monomer and a 1-butene monomer.

Examples of the (A) polypropylene-based resin include, specifically, a propylene homopolymer, a propylene random polymer, a propylene block polymer, and the like.

The (A) polypropylene-based resin is preferably a homopolymer of a propylene monomer, and preferably a propylene homopolymer.

The (A) polypropylene-based resin has preferably a melt mass flow rate (MFR) of 0.2 g/10 minutes or more.

As a value of the melt mass flow rate is lower, the (A) polypropylene-based resin is usually advantageous for imparting a higher melt tension to the modified polypropylene-based resin.

On the other hand, as a value of the melt mass flow rate is higher, the (A) polypropylene-based resin can reduce a load of an instrument more when the resin composition is melt-kneaded with an extruder or the like.

From such a point, the melt mass flow rate (MFR) of the (A) polypropylene-based resin is more preferably 0.3 g/10 minutes or more, and particularly preferably 0.5 g/10 minutes or more.

On the other hand, the melt mass flow rate (MFR) is preferably 15 g/10 minutes or less, more preferably 10 g/10 minutes or less, and particularly preferably 5 g/10 minutes or less.

In addition, the MFR of the (A) polypropylene-based resin is measured under the condition of a test temperature of 230° C. and a load of 21.18N in accordance with the B method of JIS K7210:1999.

[(B) Organic Peroxide]

The (B) organic peroxide of the present embodiment has the ability to extract hydrogen from the polypropylene-based resin, and examples thereof include, but are not particularly limited to, hydroperoxide, dialkyl peroxide, a peroxyester, diacyl peroxide, peroxydicarbonate, peroxy ketal, ketone peroxide, and the like.

Examples of the hydroperoxide include permethanehydroperoxide, diisopropylbenzene hydroperoxide, cumene hydroperoxide, t-butyl hydroperoxide, and the like.

Examples of the dialkyl peroxide include dicumyl peroxide, di-t-butyl peroxide, 2,5-dimethyl-2,5-di(t-butylperoxy)-hexyne-3, and the like.

Examples of the peroxy ester include t-butylperoxy 2-ethylhexyl carbonate, t-hexylperoxyisopropyl monocarbonate, t-hexyl peroxybenzoate, t-butyl peroxybenzoate, t-butyl peroxylaurate, t-butylperoxy-3,5,5-trimethyl hexanoate, t-butyl peroxyacetate, 2,5-dimethyl 2,5-di(benzoylperoxy)hexane, t-butylperoxy isopropyl monocarbonate, and the like.

Examples of the diacyl peroxide include dibenzoyl peroxide, di(4-methylbenzoyl) peroxide, di(3-methylbenzoyl) peroxide, and the like.

Examples of the peroxy dicarbonate include di(2-ethylhexyl)peroxy dicarbonate, diisopropylperoxy dicarbonate, and the like.

Examples of the peroxy ketal include 1,1-di-t-butylperoxy-3,3,5-trimethylcyclohexane, 1,1-di-t-butylperoxycyclohexane, 2,2-di(t-butylperoxy)-butane, n-butyl 4,4-di-(t-butylperoxy)valerate, 2,2-bis(4,4-di-t-butylperoxycyclohexyl) propane, and the like.

Examples of the ketone peroxide include methyl ethyl ketone peroxide, acetylacetone peroxide, and the like.

The (B) organic peroxide of the present embodiment is preferably peroxy ester, diacyl peroxide, or peroxy dicarbonate.

It is preferable that the organic peroxide has a structure represented by the following general formula (X).

[Chemical Formula 1]

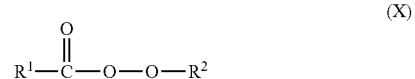

(X)

(In the formula, $R^1$ represents a substituted or non-substituted phenyl group or a substituted or non-substituted alkoxy group, and $R^2$ represents a monovalent organic group.)

In addition, when "$R^1$" is an alkoxy group in the general formula (X), it is preferable that "$R^1$" is an alkoxy group in which an oxygen atom is bonded to an alkyl group of 3 to 8 carbon atoms having a branched structure (for example, isopropyl, t-butyl, t-hexyl, 2-ethylhexyl or the like).

When "$R^1$" is other than an alkoxy group in which an oxygen atom is bonded to 2-ethylhexyl, it is preferable that an oxygen atom is bonded to secondary carbon or tertiary carbon, and it is preferable that "$R^1$" has a structure represented by the following general formula (Y).

[Chemical Formula 2]

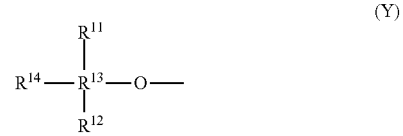

(Y)

(In the formula, any one of "$R^{11}$" and "$R^{12}$" is a methyl group, and the other is a hydrogen atom, "$R^{14}$" represents a straight alkyl group having 1 to 6 carbon atoms, and "$R^{13}$" represents secondary carbon or tertiary carbon.)

In addition, when "$R^1$" is either a substituted or non-substituted phenyl group, it is preferable that "$R^1$" is a non-substituted phenyl group, or a substituted phenyl in which one hydrogen atom is substituted with a methyl group.

Additionally, it is also preferable that "$R^2$" has a bulky structure such as branched alkyl and phenyl.

Specifically, it is preferable that "$R^2$" has a structure represented by the following general formula (Z).

[Chemical Formula 3]

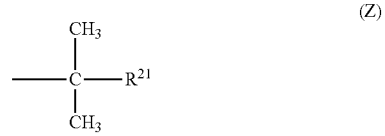

(Z)

(In the formula, "$R^{21}$" represents either a straight alkyl group having 1 to 6 carbon atoms or a monovalent organic group having a phenyl group.)

Examples of the organic peroxide having a structure represented by the general formula (X) include t-butylperoxy 2-ethylhexyl carbonate, t-hexylperoxy isopropyl monocarbonate, t-butylperoxy isopropyl monocarbonate, t-hexylperoxy benzoate, 2,5-dimethyl-2,5-di(benzoylperoxy) hexane, dibenzoyl peroxide, di(4-methylbenzoyl) peroxide, diisopropylperoxy dicarbonate, and the like.

The content of the (B) organic peroxide in the resin composition is 0.1 parts by mass or more and 1.5 parts by mass or less based on 100 parts by mass of the (A) polypropylene-based resin.

Since when the content of the (B) organic peroxide is too small in the modified polypropylene-based resin of the present embodiment, reactivity of the resin composition is reduced, there is a possibility that the good modifying effect is not exerted.

In the modified polypropylene-based resin of the present embodiment, when the content of the (B) organic peroxide is too large, a degradation reaction of the polypropylene-based resin becomes easy to occur at melt-kneading.

When a degradation reaction of the polypropylene-based resin is excessively generated at melt-kneading, there is a possibility that the better modifying effect is not exerted.

That is, since the content of the (B) organic peroxide in the resin composition is 0.1 parts by mass or more and 1.5 parts by mass or less, necessity of controlling the reaction condition at melt-kneading at a high procession for preparing the modified polypropylene-based resin having an excellent melt tension can be reduced.

In the present embodiment, in order to more surely prepare the modified polypropylene-based resin having an excellent melt tension, the content of the (B) organic peroxide is preferably 0.3 parts by mass or more based on 100 parts by mass of the (A) polypropylene-based resin.

On the other hand, the content of the (B) organic peroxide is preferably 1.0 part by mass or less based on 100 parts by mass of the (A) polypropylene-based resin.

[(C) Aromatic Vinyl Monomer]

The (C) aromatic vinyl monomer is a component which chemically bonds to the (A) polypropylene-based resin to form a branched structure and, at the same time, acts as a crosslinking agent that crosslinks polypropylene-based resins.

Only one kind, or two or more kinds of the (C) aromatic vinyl monomer(s) may be contained in the resin composition of the present embodiment.

Examples of the aromatic vinyl monomer include styrene; methyl styrene such as o-methylstyrene, m-methylstyrene, p-methylstyrene, α-methylstyrene, β-methylstyrene, dimethylstyrene, and trimethylstyrene; chlorostyrene such as α-chlorostyrene, β-chlorostyrene, o-chlorostyrene, m-chlorostyrene, p-chlorostyrene, dichlorostyrene, and trichlorostyrene; bromostyrene such as o-bromostyrene, m-bromostyrene, p-bromostyrene, dibromostyrene, and tribromostyrene; fluorostyrene such as o-fluorostyrene, m-fluorostyrene, p-fluorostyrene, difluorostyrene, and trifluorostyrene; nitrostyrene such as o-nitrostyrene, m-nitrostyrene, p-nitrostyrene, dinitrostyrene, and trinitrostyrene; vinylphenol such as o-hydroxystyrene, m-hydroxystyrene, p-hydroxystyrene, dihydroxystyrene, and trihydroxystyrene; divinylbenzene such as o-divinylbenzene, m-divinylbenzene, and p-divinylbenzene; isopropenylbenzene such as o-diisopropenylbenzene, m-diisopropenylbenzene, and p-diisopropenylbenzene.

Among them, the aromatic vinyl monomer is preferably styrene.

The content of the (C) aromatic vinyl monomer in the resin composition is 0.1 parts by mass or more and 10 parts by mass or less based on 100 parts by mass of the (A) polypropylene-based resin.

Since when the content of the (C) aromatic vinyl monomer is too small in the modified polypropylene-based resin, a branched or crosslinked structure is not sufficiently formed at melt-kneading, and suppression of degradation of the resin with the peroxide also becomes insufficient, there is a possibility that the good modifying effect, cannot be exerted.

Since when the content of the (C) aromatic vinyl monomer is too large in the modified polypropylene-based resin, a part of the (C) aromatic vinyl monomer easily becomes unreacted at melt-kneading, there is a possibility that a large amount of an oligomer is contained in the modified polypropylene-based resin, or a problem of cloudiness due to microphase separation or the like is generated.

That is, since the content of the (C) aromatic vinyl monomer in the resin composition is 0.1 parts by mass or more and 10 parts by mass or less, there can be reduced necessity of controlling the reaction condition at melt-kneading at a high precision for preparing the modified polypropylene-based resin from which an expanded sheet having a low open cell ratio can be obtained.

[(D) Radical Scavenger]

In order to obtain the modified polypropylene-based resin, it is preferable that the resin composition contains (D) a radical scavenger, in order to control its reactivity.

Use of the (D) radical scavenger is effective in enhancing a melt tension of the modified polypropylene-based resin.

That is, the (D) radical scavenger is effective in obtaining a resin foam having good appearance using the modified polypropylene-based resin.

The (D) radical scavenger can react with an alkyl radical species.

It is preferable that the (D) radical scavenger can bond to an aromatic vinyl monomer after it has bonded to an alkyl radical.

Only one kind of the (D) radical scavenger may be used, or two or more kinds of the (D) radical scavengers may be used concurrently.

Examples of the (D) radical scavenger include a quinone compound (quinones), a naphthoquinone compound (naphthoquinones), a phenothiazine compound (phenothiazines), and the like.

Examples of the quinone compound include p-benzoquinone, p-naphthoquinone, 2-t-butyl-p-benzoquinone, 2,5-diphenyl-p-benzoquinone, and the like. Examples of the naphthoquinone compound include 1,4-naphthoquinone, 2-hydroxy-1,4-naphthoquinone, vitamin K, and the like.

Examples of the phenothiazine compound include phenothiazine, bis-(α-methylbenzyl)phenothiazine, 3,7-dioctylphenothiazine, bis-(α-dimethylbenzyl)phenothiazine, and the like.

In the resin composition, the content of the (D) radical scavenger is preferably 0.005 parts by mass or more, and more preferably 0.05 parts by mass or more, based on 100 parts by mass of the (A) polypropylene-based resin.

On the other hand, the content of the (D) radical scavenger is preferably 1 part by mass or less, based on 100 parts by mass of the (A) polypropylene-based resin.

When the content of the (D) radical scavenger is the above-described lower limit or more and the above-described upper limit or less, a melt tension of the modified polypropylene-based resin is effectively increased, and appearance of the finally obtained foam becomes good.

Examples of the (E) other component to be contained in the resin composition in addition to them include various additives.

[(E) Additive]

An (E) additive is appropriately used depending on a variety of purposes, without particular limitation.

Specific examples of the (E) additive include a weather-resistant stabilizer, an antistatic agent, an antioxidant, a deodorizing agent, a light stabilizer, a crystal nucleating agent, a pigment, a lubricant, a surfactant for the purpose of imparting sliding property or imparting anti-blocking property, an inorganic filler, as well as a dispersibility-improving agent which improves dispersibility of an inorganic filler, and the like.

Examples of the dispersibility-improving agent include a higher fatty acid, a higher fatty acid ester, a higher fatty acid amide, and the like.

The (E) additive may be contained in the resin composition before melt-kneading, or at melt-kneading.

Alternatively, the (E) additive may be contained in the modified polypropylene-based resin by adding it after melt-kneading.

Only one kind of the (E) additive may be used, or two or more kinds of the (E) additives may be used concurrently.
(Method for Producing Modified Polypropylene-Based Resin)

In a method for producing a modified polypropylene-based resin, a resin composition including the (A) polypropylene-based resin, the (B) organic peroxide, and the (C) aromatic vinyl monomer is melt-kneaded to obtain the modified polypropylene-based resin.

In the method for producing a modified polypropylene-based resin, the resin composition to be subjected to the melt-kneading contains 0.1 parts by mass or more and 1.5 parts by mass or less of the organic peroxide based on 100 parts by mass of the polypropylene-based resin, and contains 0.1 parts by mass or more and 10 parts by mass or less of the aromatic vinyl monomer based on 100 parts by mass of the polypropylene-based resin.

The resin composition is heated in order to bring the resin composition into the molten state, at melt-kneading of the resin composition.

The resin composition is reacted by heating at melt-kneading thereof.

That is, by the heating, the organic peroxide generates a radical, and the radical attacks hydrogen bonded to tertiary carbon of the polypropylene-based resin to form an alkyl radical.

In addition, in its present condition, β cleavage occurs to generate molecular cutting of the polypropylene-based resin, but in the present embodiment, the aromatic vinyl monomer bonds to the relevant place to form a branched structure (crosslinked structure).

From a view point that the addition effect is made to be remarkable, it is preferable that after the (A) polypropylene-based resin and the (B) organic peroxide are mixed to obtain a mixture, the (C) aromatic vinyl monomer is added to the resulting mixture.

The (A) polypropylene-based resin, the (B) organic peroxide, and the (C) aromatic vinyl monomer may be mixed at once.

The (D) radical scavenger may be added before the (C) aromatic vinyl monomer is added, or may be added after the (C) aromatic vinyl monomer is added, or may be mixed with other components at once.

The (E) additive may be added before the (C) aromatic vinyl monomer is added, or may be added after the (C) aromatic vinyl monomer is added, or may be mixed with other components at once.

In addition, melt-kneading of the resin composition can be performed using general instruments such as a kneader, a Banbury mixer, and an extruder.

When the resin composition is melt-kneaded, it is preferable to use an extruder.

It is preferable that the resin composition is supplied to an extruder to perform a crosslinking reaction in the extruder, and a modified polypropylene-based resin is extruded from the extruder, while forming the modified polypropylene-based resin.

By continuously supplying the resin composition to an extruder, and continuously extruding a modified polypropylene-based resin from the extruder, the modified polypropylene-based resin is effectively obtained.

Examples of the extruder include a single screw extruder, a twin-screw extruder, and the like.

The extruder can be used alone, or a tandem-type extruder in which a plurality of extruders are connected can be used in producing the modified polypropylene-based resin.

Particularly, from a view point that dispersibility and reactivity of other components to the polypropylene-based resin being a base resin are further enhanced, the twin-screw extruder is preferable.
(Resin Foam)

The modified polypropylene-based resin of the present embodiment can be suitably used for obtaining a resin foam.

By using the modified polypropylene-based resin of the present embodiment, a resin foam having good appearance can be obtained.

As the resin foam, a polypropylene-based resin expanded sheet obtained by extrusion expansion into a sheet shape (hereinafter, also simply referred to as "expanded sheet") is preferable.

The expanded sheet is obtained by expanding the modified polypropylene-based resin, and for example, is obtained by expanding the modified polypropylene-based resin using a blowing agent.

The expanded sheet may contain a polymer component in addition to the modified polypropylene-based resin.

As the polymer component, an unmodified polypropylene-based resin is preferable.

Examples of this propylene-based resin include those exemplified above as a starting material of the modified polypropylene-based resin.

As the polypropylene-based resin constituting the expanded sheet together with the modified polypropylene-based resin, a soft polypropylene-based resin obtained by a multistep polymerization method is preferable.

That is, as the polypropylene-based resin, a polypropylene-based resin which is obtained by passing through at least two stages of steps of: a first stage of performing homopolymerization of propylene or random copolymerization of propylene and ethylene; and a second stage of performing copolymerization of ethylene and one or more α-olefins having 3 or more carbon atoms after the first stage is preferable.

In addition, when a polymer component other than the modified polypropylene-based resin is contained in the expanded sheet, the modified polypropylene-based resin and other polymer component can be contained in the expanded sheet at the mass ratio of, for example, 8:2 to 2:8 (modified polypropylene-based resin:other polymer).

In addition, when in addition to the modified polypropylene-based polymer, other polymer component is used in forming the expanded sheet, it is preferable that also concerning a mixture obtained by mixing all polymers (including modified polypropylene-based resin) to be contained in the expanded sheet, a phase angle determined with a frequency dispersion dynamic viscoelasticity measurement at 200° C. shows 30° or more and 70° or less at a frequency of 0.01 Hz, like the modified polypropylene-based resin.

The blowing agent is not particularly limited.

The blowing agent may be a chemical blowing agent, or may be a physical blowing agent.

The blowing agent is preferably an easily volatile blowing agent.

It is preferable that a boiling point of the blowing agent is not higher than a softening temperature of the modified polypropylene-based resin.

Examples of the blowing agent include hydrocarbons such as propane, n-butane, i-butane, n-pentane, i-pentane, and cyclopentane; halides of them; a carbonic acid gas; nitrogen; and the like.

Only one kind of the blowing agent may be used, or two or more kinds of the blowing agents may be used concurrently.

The density of the expanded sheet is preferably 0.025 g/cm$^3$ or more, and more preferably 0.045 g/cm$^3$ or more.

On the other hand, the density of the expanded sheet is preferably 0.5 g/cm$^3$ or less, and more preferably 0.25 g/cm$^3$ or less.

When the density of the expanded sheet is the above lower limit or higher, rigidity and heat resistance of the expanded sheet are enhanced.

When the density is the above upper limit or lower, heat insulating property of the expanded sheet is enhanced.

Additionally, generally, there is a tendency that when expanded at the high expansion ratio to reduce the density of the expanded sheet, appearance of the expanded sheet is deteriorated.

To the contrary, even when the density of the expanded sheet is reduced by expansion at the high expansion ratio by using the modified polypropylene-based resin, the expanded sheet having good appearance can be obtained.

The density of the expanded sheet is measured by a method described in JMS K7222:1999 "Cellular Plastics and Rubbers—Determination of Apparent (Bulk) Density", and specifically, the density is measured by the following method.

(Density Measurement Method)

A 100 cm$^3$ or more sample is cut from the expanded sheet so as not to alter an original cell structure, this sample is conditioned for 16 hours under the environment of JIS K7100:1999 Symbol 23/50, 2-Class, and thereafter, the dimension and the mass thereof are measured to calculate the density by the following equation.

Apparent density (g/cm$^3$)=mass of foam (g)/volume of foam (cm$^3$)

In addition, for measuring the dimension of a test piece, for example, "DIGIMATIC" CD-15 Type manufactured by Mitutoyo Corporation can be used.

An open cell ratio of the expanded sheet is preferably 30% or less, and more preferably 20% or less.

As the open cell ratio is lower, appearance of the expanded sheet becomes better, and strength of the expanded sheet is increased.

In addition, the open cell ratio means the open cell ratio in a cell structure of the expanded sheet. Cells in which a cell (unit of a cellular structure) continues to an adjacent cell is referred to as open cells, and cells in which each cell is completely independent is referred to as closed cells.

The open cell ratio in the expanded sheet is measured by the following method.

That is, a plurality of sheets of length 25 mm and width 25 mm are excised from the expanded sheet, excised sheets are overlapped so as not to form any space, to obtain a sample for measurement having the thickness of 25 mm, and the external dimension of this sample for measurement is measured up to 1/100 mm using "Digimatic Caliper" manufactured by Mitutoyo Corporation, to obtain the apparent volume (cm$^3$).

Then, using an air-comparison pycnometer Type 1000 (manufactured by Tokyoscience Co., Ltd.), the volume (cm$^3$) of the sample for measurement is obtained by the 1-1/2-1 atm method.

The open-cell ratio (%) is calculated by these values obtained and the following equation, and an average of five tests is obtained.

In addition, measurement is performed under the environment of JIS K7100-1999 Symbol 23/50, 2-Class, after conditioning of the sample for measurement for 16 hours under the environment of JIS K7100-1999 Symbol 23/50, 2-Class.

Additionally, the air-comparison pycnometer is corrected with a standard sphere (Large 28.9 cc Small 8.5 cc).

Open cell ratio (%)=100×(apparent volume−volume measured with air-comparison pycnometer)/apparent volume In addition, by extrusion-expanding a polypropylene-based resin composition including the modified polypropylene-based resin of the present embodiment using a circular die or the like, an expanded sheet having beautiful appearance can be obtained at the high expansion ratio.

When a rod-shaped foam or a board-shaped foam is prepared with a sizing die, the polypropylene-based resin composition which has become in the molten state in an extruder is cooled with a die to form a specific shape, which is extruded.

At that time, the polypropylene-based resin composition which has been extruded into a sizing die from the extruder can only be expanded until the composition becomes in the state where it is filled into a space inside the die, and the composition is brought in the state where expansion is regulated to some extent.

Additionally, by friction resistance generated between a rod-shaped or board-shaped expanded molded article which is extruded from a sizing die and an inner wall surface of the sizing die, a certain degree of a pressure is generated inside the die.

Accordingly, in the polypropylene-based resin composition which has been extruded into the sizing die from the extruder, a pressure is not released at once, unlike the case where an expanded sheet is prepared using the circular die or the flat die.

On the other hand, when the expanded sheet is prepared with the circular die or the like, the polypropylene-based resin composition is usually extruded into an entirely opened space, and generates rapid volume expansion (expanding) immediately after it is discharged from a die slit.

Accordingly, at production of the expanded sheet, the propylene-based resin composition undergoes shear at the die slit at a high speed, and at the same time, an extension speed of a cell membrane is also increased, unlike the case where a rod-shaped or board-shaped expanded molded article is subjected to extrusion expansion.

For this reason, even the conventional modified polypropylene-based resin which can bring a rod-shaped or board-shaped expanded molded article into the better expanded state hardly allows an expanded sheet to have beautiful appearance and high expansion ratio.

Since the modified polypropylene-based resin of the present embodiment shows specific viscoelasticity at melting, the expanded sheet having beautiful appearance and high expansion ratio can be obtained.

In addition, upon preparation of the modified polypropylene-based resin of the present embodiment, a polymer highly remarkably increased in a molecular weight may be generated among polymers having an ordinary molecular weight.

Since such a product increased in a molecular weight shows a heat melting behavior which is greatly different as compared with that of a polymer having an ordinary molecular weight, when it is contained in an expanded sheet at a large amount, there is a possibility that appearance of the expanded sheet is deteriorated.

At what ratio this product increased in a molecular weight is contained in the modified polypropylene-based resin or the expanded sheet can be obtained by a so-called "gel content".

The modified polypropylene-based resin used for forming an expanded sheet, and an expanded sheet have the gel content of preferably 20% by mass or less, and preferably 5% by mass or less.

In order to obtain the gel content of "0% by mass", there is a possibility that the condition for producing the modified polypropylene-resin is limited to a narrow range.

From such a view point, it is considered that the gel content is preferably around 0.5 to 5% by mass.

In addition, the gel content of the modified polypropylene-based resin or the expanded sheet can be obtained by the following method.

[Gel Content Measuring Method]

When a measurement object is pellets, a sample is used as it is, or when a measurement object is an expanded sheet, a sample is used by cutting it into around 1 cm square.

Then, 0.8 g of a measurement sample is precisely weighed from them.

After the sample is boiling-heated in 80 mL of xylene for 3 hours using a Soxhlet extraction device, liquid is filtered with a 200-mesh metal net before the liquid is chilled.

Resin insolubles on the metal net are naturally dried in a chemical hood to evaporate xylene, and finally, the resin insolubles together with the metal net are dried in a constant temperature drier at 120° C. for 2 hours.

After allowed to cool in a desiccator, the mass of the dried product together with the metal net is measured, and the gel content (% by mass) is calculated by the following equation.

Gel content (% by mass)=mass of insoluble resin on metal net (g)/mass of sample (0.8 g)×100

(Mass of insoluble resin on metal net=mass of metal net after filtration drying−mass of only metal net before filtration)

Additionally, it is preferable that the modified polypropylene-based resin or the expanded sheet is brought into the state where it shows the specific melt tension, and specifically, it is preferable that it shows the melt tension of 4 cN or more and 25 cN or less at 230° C.

In addition, the melt tension of the modified polypropylene-based resin or the expanded sheet can be obtained by the following method.

[Melt Tension Measuring Method]

A sample is used as it is when a measurement object is pellets, and when a measurement object is an expanded sheet, a sample obtained by pelletizing the expanded sheet using a pelletizer "Hand Truder Model PM-1" manufactured by TOYO SEIKI SEISAKU-SHO, LTD., under the condition of a cylinder temperature of 220° C. and a stand-by time of from sample filling to extrusion initiation of 2.5 minutes is used.

The melt tension is measured using a twin bore capillary rheometer Rheologic 5000T (manufactured by Company CEAST, Italy).

That is, after a measurement sample resin is filled into a barrel having the diameter of 15 mm heated at a test temperature of 230° C., and pre-heated for 5 minutes, while the sample is extruded into a string shape, from a capillary die (caliper 2.095 mm, length 8 mm, inflow angle 90 degree (conical)), with a piston lowering rate (0.07730 mm/s) being retained constant, this string shaped product is passed through a pulley for tension detection positioned 27 cm below the capillary die, and is wound using a winding roll while a winding rate thereof is gradually increased at an initial rate of 3.94388 mm/s, and an acceleration rate of 12 mm/s$^2$, and an average of maximum and minimum immediately before cutting of the string shaped product is adopted as the melt tension of the sample.

In addition, when there is only one maximum on a tension chart, that maximum is adopted as the melt tension.

Additionally, it is preferable that the modified polypropylene-based resin or the expanded sheet is brought into the state where it shows a specific melt flow rate (MFR).

Specifically, MFR of the modified polypropylene-based resin or the expanded sheet is preferably 2.0 g/10 minutes or less at 230° C.

Additionally, in view of a load on an extruder, it is preferable that MFR of the modified polypropylene-based resin or the expanded sheet exceeds 0 g/10 minutes.

In addition, MFR of the modified polypropylene-based resin or the expanded sheet can be obtained by the following method.

[MFR Measuring Method]

When a measuring object is pellets, the pellets are used as it is as a sample for measurement.

When a measurement object is an expanded sheet, a sample obtained by pelletizing the expanded sheet using a pelletizer "Hand Truder Model PM-1" manufactured by TOYO SEIKI SEISAKU-SHO, LTD. is used as a sample for measurement.

In addition, a cylinder temperature upon preparation of pellets from the expanded sheet using a pelletizer is 220° C., and a stand-by time of from sample filling to extrusion initiation is 2.5 minutes.

The melt mass flow rate (MFR) is measured using SEMI AUTO MELT INDEXER 2A manufactured by TOYO SEIKI SEISAKU-SHO, LTD. by "b) Method of measuring time during which piston travels predetermined distance" described in the B method of JIS K 7210:1999 "Plastics—Determination of the Melt Mass-Flow Rate (MFR) and Melt Volume-Flow Rate (MVR) of Thermoplastics".

The measuring condition is a sample amount of 3 to 8 g, a pre-heating time of 270 seconds, a load holding time of 30 seconds, a sample temperature of 230° C., a test load of 21.18 N, and a piston traveling distance (interval) of 4 mm.

The number of times is three times, and an average thereof is adopted as a value of the melt mass flow rate (g/10 minutes).

The expanded sheet of the present embodiment is useful as it is as an expanded molded article such as a cushioning sheet, and at the same time, is useful as a raw material of an expanded molded article to which a three-dimensional shape has been imparted by thermal molding or the like.

Examples of the thermal molding include vacuum molding, pressure molding, vacuum pressure molding, match mold molding, press molding, and the like.

As a specific product which is prepared by this thermal molding, a container is preferable.

Since the thus prepared expanded resin-made container is not only light and of high strength, but also is easily produced at a large scale, it is preferably utilized as various packaging containers.

Additionally, since the expanded resin-made container is also excellent in heat insulating property or the like, it is preferably used in food packaging.

On a surface of the expanded molded article of the present embodiment, a non-woven fabric, a metal foil, a facial tissue, a printing film or the like may be laminated, depending on intended use.

In addition, in the present embodiment, concerning the modified polypropylene-based resin or a method for preparing it, the aforementioned exemplification is performed, but the present invention is not limited to the above-mentioned exemplification.

Additionally, in the present embodiment, as a resin foam which is prepared as the modified polypropylene-based resin, an expanded sheet is exclusively exemplified, but the modified polypropylene-based resin of the present invention can be widely utilized in resin products other than the expanded sheet.

EXAMPLES

The present invention will be explained in further detail below by way of Examples, but the present invention is not limited by these exemplifications.

Example 1

(1) Preparation of Modified Polypropylene-Based Resin 100 parts by mass of a polypropylene-based resin (homopolypropylene resin, manufactured by Prime Polymer Co., Ltd., product name "E200GP", MFR=2.0 g/10 minutes, density=0.9 g/cm$^3$) and 0.3 parts by mass of t-butylperoxy benzoate (manufactured by NOF CORPORATION, product name "PERBUTYL Z", one-minute half-life temperature: 166.8° C.) were stirred and mixed with a ribbon blender to obtain a mixture.

The resulting mixture was supplied to a twin-screw extruder (L/D=47) having the caliper of 30 mm, and a styrene monomer was supplied at a middle of the twin-screw extruder using a liquid injecting pump, at the ratio of 0.5 parts by mass based on 100 parts by mass of the polypropylene-based resin.

A temperature at a feed portion was set at 160° C., a temperature T1 up to a styrene injection position was set at 200° C., and a temperature thereafter T2 was set at 200° C. the resin composition was melt-kneaded in the twin-screw extruder under the condition of the rotation speed of 72 rpm, and the resin composition was extruded into a strand shape from a die having the caliper of 4 mm, the land of 5 mm, and the number of pores of 2, which had been attached to a tip of the extruder, at a discharge amount of 5 kg/h.

Then, the extruded strand-shaped resin composition was passed through a cooling water bath having the length of 2 m and housing water at 30° C., and cooled.

The cooled strand-shaped resin composition was cut with a pelletizer to obtain pellets of a modified polypropylene-based resin.

(2) Preparation of Foam 100 parts by mass of the resulting modified polypropylene-based resin and 0.2 parts by mass of a cell adjusting agent (manufactured by Dainichiseika Color & Chemicals Mfg. Co., Ltd., product name "Fine Cell Master HCPO410K") were dry blended to obtain a mixture.

A tandem-extruder provided with a first extruder having the caliper φ50 mm and a second extruder having the caliper φ65 mm was set, and the resulting mixture was supplied to the first extruder having the caliper φ50 mm through a hopper, and heated and melted.

Thereafter, as a blowing agent, butane (isobutane/normal butane=70/30) was pressed into the first extruder, and melted and mixed together with the mixture.

Then, this molten mixture was transferred to the second extruder having the caliper of 65 mm, uniformly cooled to a temperature suitable for extrusion expansion, and subjected to extrusion expansion through a cylindrical die having the caliper of 60 mm at a discharge amount of 30 kg/hour to obtain a cylindrical foam.

The resulting cylindrical foam was cooled from an inner side, along on a mandrel of φ170, in which the interior was cooled with water at about 20° C.

Additionally, the cylindrical foam was cooled from an outer side, by blowing the air thereto from an air ring having the larger diameter than that of the cylindrical foam.

The cooled cylindrical foam was slit with a cutter at one point of a circumference, to obtain a belt-shaped expanded sheet.

Examples 2 to 12, Comparative Examples 1 to 6

According to the same manner as that described above except that the polypropylene-based resin to be used, a styrene amount, a kind and an amount of the organic peroxide, and a set temperature (T1, T2) of the twin-screw extruder were changed as in the following Table, those Examples and Comparative Examples were implemented.

In addition, "E111G" in the Table means the following polypropylene-based resin.

Additionally, details of the organic peroxide in the Table are as follows.

"E111G":

Homopolypropylene resin, manufactured by Prime Polymer Co., Ltd., product name "E111G", MFR=0.5 g/10 minutes, density=0.9 g/cm$^3$ "t-Butylperoxy isopropyl carbonate":

manufactured by Kayaku Akzo Corporation, product name "Kayacarbon BIC-75", one-minute half-life temperature: 156° C.

"t-Butylperoxy 2-ethylhexyl carbonate":

manufactured by Kayaku Akzo Corporation, product name "Trigonox 117", one-minute half-life temperature: 156° C.

"2,5-Dimethyl-2,5-di(t-butylperoxy)-hexane":

manufactured by NOF CORPORATION, product name "PERHEXA 25B", one-minute half-life temperature: 179.80° C.

"1,1-Di(t-butylperoxy)cyclohexane":

manufactured by NOF CORPORATION, product name "PERBUTYL C", one-minute half-life temperature: 153.8° C.

TABLE 1

|  | PP resin | Styrene [phr] | Organic peroxide | Organic peroxide [phr] | Extrusion temperature (° C.) T1/T2 |
|---|---|---|---|---|---|
| Example 1 | E200GP | 0.5 | t-Butylperoxy benzoate | 0.3 | 200/200 |
| Example 2 | E200GP | 7.5 | t-Butylperoxy benzoate | 0.7 | 200/200 |
| Example 3 | E200GP | 2.0 | t-Butylperoxy benzoate | 0.1 | 200/200 |
| Example 4 | E200GP | 3.0 | t-Butylperoxy benzoate | 1.5 | 200/200 |
| Example 5 | E200GP | 3.0 | t-Butylperoxy benzoate | 1.0 | 200/200 |
| Example 6 | E111G | 2.0 | t-Butylperoxy benzoate | 0.3 | 200/200 |
| Example 7 | E200GP | 2.5 | t-Butylperoxy benzoate | 0.7 | 200/200 |
| Example 8 | E111G | 2.0 | t-Butylperoxy benzoate | 0.7 | 200/200 |
| Example 9 | E200GP | 2.5 | t-Butylperoxy isopropyl carbonate | 0.5 | 200/230 |
| Example 10 | E200GP | 2.5 | t-Butylperoxy 2-ethylhexyl carbonate | 0.5 | 200/230 |
| Example 11 | E200GP | 2.5 | t-Butylperoxy benzoate | 0.5 | 200/230 |
| Example 12 | E111G | 2.0 | t-Butylperoxy benzoate | 0.7 | 200/230 |
| Comparative Example 1 | E200GP | 0 | t-Butylperoxy benzoate | 0.1 | 200/200 |
| Comparative Example 2 | E200GP | 3.0 | t-Butylperoxy benzoate | 0.05 | 200/200 |
| Comparative Example 3 | E111G | 10 | t-Butylperoxy benzoate | 1.75 | 200/200 |
| Comparative Example 4 | E200GP | 0 | — | 0 | 200/200 |
| Comparative Example 5 | E200GP | 2.0 | 2,5-Dimethyl-2,5-di(t-butylperoxy)-hexane | 0.3 | 200/200 |
| Comparative Example 6 | E200GP | 2.0 | 1,1-Di(t-butylperoxy)cyclohexane | 0.3 | 200/200 |

(1) Preparation of Mixed Resin with Modified Polypropylene-Based Resin

Example 13

The modified polypropylene-based resin obtained in Example 11 and a soft polypropylene resin (manufactured by SunAllomer Ltd., product name "Q100F", MFR: 0.6 g/10 minutes, density 0.88 g/cm$^3$) were stirred and mixed with a ribbon blender at the blending ratio of 8:2, to obtain a mixture.

Using product name "Labo Plastomill" (Model: 4M150 (body) attached with Model: 2D15W (twin-screw extruder, caliper: 15 mm, L/D: 17) and a mold with a circular opening having the diameter of 3 mm) manufactured by TOYO SEIKI SEISAKU-SHO, LTD., a temperature of all zones of the twin-screw extruder was set at 230° C., and at the same time, the rotation speed of the screw was fixed at 65 rpm, and the mixture was melt-kneaded, and extruded into a strand shape at a discharge amount of 1.0 kg/h.

Then, the extruded strand-shaped resin composition was passed through a cooling water bath having the length of 1 m and housing water at 30° C., to cool.

The cooled strand-shaped resin composition was cut with a pelletizer to obtain resin composition pellets including a modified polypropylene-based resin.

(2) Preparation of Foam

A foam (expanded sheet) was manufactured as in Example 1.

Examples 14 to 17

According to the same manner as in Example 13 except that the blending ratio of a resin to be mixed with the modified polypropylene-based resin, and a resin to be mixed were changed as in the following Table, an expanded sheet was prepared.

TABLE 2

|  | Mixed resin | Blending ratio Modified polypropylene:mixed resin |
|---|---|---|
| Example 13 | Q100F | 8:2 |
| Example 14 | Q100F | 5:5 |
| Example 15 | E200GP | 8:2 |
| Example 16 | E200GP | 5:5 |
| Example 17 | E200GP | 2:8 |

Assessment of physical properties of the resulting resin composition pellets and expanded sheet were performed, and results are shown in Table 3.

In addition, a phase angle is a value at a frequency of 0.01 Hz determined with a frequency dispersion dynamic viscoelasticity measurement at 200° C.

In addition, criteria for determining appearance of the expanded sheet in Table are as follows.

[Appearance]

A: Irregularity is not confirmed visually on an expanded sheet surface, and the surface state (smoothness) is good.

B: Irregularity is confirmed visually on an expanded sheet surface, but this is at the practically not problematic level.

C: Irregularity can be confirmed visually on an expanded sheet surface, or membrane breakage is severe, and the surface state is bad.

TABLE 3

| | Pellet physical properties | | | | Expanded sheet physical properties | | |
|---|---|---|---|---|---|---|---|
| | Phase angle [°] | Gel content [wt %] | Melt tension [cN] | MFR [g/10 minutes] | Apparent density [g/cm³] | Open cell ratio [%] | Appearance |
| Example 1 | 67.0 | 0.4 | 5.0 | 1.95 | 0.46 | 28 | A |
| Example 2 | 34.8 | 5.0 | 21.5 | 0.68 | 0.35 | 25 | A |
| Example 3 | 65.6 | 0.5 | 4.4 | 2.00 | 0.45 | 29 | A |
| Example 4 | 34.2 | 17.1 | 11.7 | 1.43 | 0.42 | 30 | B |
| Example 5 | 41.2 | 4.2 | 16.8 | 1.04 | 0.38 | 23 | A |
| Example 6 | 41.2 | 0.5 | 15.0 | 1.18 | 0.25 | 20 | A |
| Example 7 | 59.7 | 0.8 | 8.3 | 1.70 | 0.40 | 22 | A |
| Example 8 | 38.7 | 1.1 | 19.9 | 0.48 | 0.31 | 18 | A |
| Example 9 | 44.3 | 0.8 | 20.2 | 0.78 | 0.16 | 14 | A |
| Example 10 | 49.5 | 0.6 | 17.0 | 1.03 | 0.22 | 16 | A |
| Example 11 | 46.1 | 0.6 | 20.6 | 0.75 | 0.18 | 15 | A |
| Example 12 | 41.4 | 2.0 | 22.9 | 0.35 | 0.18 | 12 | A |
| Example 13 | 58.9 | 0.5 | 6.4 | 1.84 | 0.40 | 22 | A |
| Example 14 | 62.6 | 0.5 | 9.1 | 1.64 | 0.41 | 20 | A |
| Example 15 | 62.8 | 0.5 | 6.3 | 1.86 | 0.45 | 25 | A |
| Example 16 | 69.7 | 0.4 | 6.5 | 1.84 | 0.44 | 25 | A |
| Comparative Example 1 | | | | — | | | |
| Comparative Example 2 | 71.3 | 0.5 | 3.3 | 2.8 | 0.44 | 45 | C |
| Comparative Example 3 | 18.3 | 59.9 | 16.1 | — | 0.43 | 36 | C |
| Comparative Example 4 | 79.2 | 0.4 | 1.9 | 2.31 | 0.45 | 60 | C |
| Comparative Example 5 | 76.1 | 0.5 | 2.6 | 2.54 | 0.40 | 51 | C |
| Comparative Example 6 | 70.8 | 0.4 | 2.9 | 2.63 | 0.40 | 48 | C |

In addition, concerning Comparative Example 1, since the sufficient modifying effect was not seen, assessment was not performed.

Additionally, concerning Comparative Example 3, in assessment of MFR, flowability was not seen at a measurement temperature, and measurement could not be performed.

Additionally, in Example 17, a phase angle of a mixture of the modified polypropylene-based resin and "E200GP" became 76.1°, and the apparent density and the open cell ratio were inferior to those of the expanded sheets of other Examples.

Additionally, in the expanded sheet of Example 17, appearance was also inferior to that of the expanded sheets of other Examples.

From this, it is seen that when a polymer other than the modified polypropylene-based resin is used as a raw material of the expanded sheet together with the modified polypropylene-based resin, it becomes particularly advantageous for obtaining the expanded sheet having a low open cell ratio that not only a phase angle of the modified polypropylene-based resin is 30° or more and 70° or less, but also a phase angle of a mixture obtained by mixing all polymers constituting the expanded sheet is 30° or more and 70° or less.

Also from the foregoing, it is seen that, according to the present invention, there are obtained a modified polypropylene-based resin from which an expanded sheet having the low open cell ratio can be easily obtained, as well as an expanded sheet in the good expanded state.

What is claimed is:

1. A modified polypropylene-based resin obtained by reacting a polypropylene-based resin with an organic peroxide and an aromatic vinyl monomer and having a phase angle determined with a frequency dispersion dynamic viscoelasticity measurement at 200° C. of 30° or more and 70° or less at a frequency of 0.01 Hz, wherein
   the organic peroxide is contained at a ratio of 0.1 parts by mass or more and 1.0 parts by mass or less based on 100 parts by mass of the polypropylene-based resin,
   the aromatic vinyl monomer is contained at a ratio of 0.1 parts by mass or more and 3.0 parts by mass or less based on 100 parts by mass of said polypropylene-based resin, and
   the organic peroxide is any mono-peroxide selected from t-butylperoxy 2-ethylhexyl carbonate, t-hexylperoxy isopropyl monocarbonate, t-butylperoxy isopropyl monocarbonate, t-hexylperoxy benzoate, dibenzoyl peroxide, di(4-methylbenzoyl) peroxide, diisopropylperoxy dicarbonate, and t-butylperoxy benzoate.

2. The modified polypropylene-based resin according to claim 1, which has a melt mass flow rate of 2.0 g/10 minutes or less.

3. A polypropylene-based resin expanded sheet comprising a modified polypropylene-based resin obtained by reacting a polypropylene-based resin with an organic peroxide and an aromatic vinyl monomer, wherein the modified polypropylene-based resin has a phase angle determined with a frequency dispersion dynamic viscoelasticity measurement at 200° C. of 30° or more and 70° or less at a frequency of 0.01 Hz, wherein
   the organic peroxide is contained at a ratio of 0.1 parts by mass or more and 1.0 parts by mass or less based on 100 parts by mass of the polypropylene-based resin,
   the aromatic vinyl monomer is contained at a ratio of 0.1 parts by mass or more and 3.0 parts by mass or less based on 100 parts by mass of said polypropylene-based resin, and
   the organic peroxide is any mono-peroxide selected from t-butylperoxy 2-ethylhexyl carbonate, t-hexylperoxy isopropyl monocarbonate, t-butylperoxy isopropyl monocarbonate, t-hexylperoxy benzoate, dibenzoyl peroxide, di(4-methylbenzoyl) peroxide, diisopropylperoxy dicarbonate, and t-butylperoxy benzoate.

4. The polypropylene-based resin expanded sheet according to claim 3, further comprising a polypropylene-based resin different from said modified polypropylene-based resin.

5. An expanded resin-made container obtained by thermally molding the polypropylene-based resin expanded sheet according to claim 3.

6. A method for producing a modified polypropylene-based resin, the method comprising:

melt-kneading a resin composition including a polypropylene-based resin, an organic peroxide, and an aromatic vinyl monomer to prepare a modified polypropylene-based resin having a phase angle determined with a frequency dispersion dynamic viscoelasticity measurement at 200° C. of 30° or more and 70° or less at a frequency of 0.01 Hz, wherein said resin composition containing 0.1 parts by mass or more and 1.0 parts by mass or less of said organic peroxide based on 100 parts by mass of said polypropylene-based resin, and containing 0.1 parts by mass or more and 3.0 parts by mass or less of said aromatic vinyl monomer based on 100 parts by mass of said polypropylene-based resin, and the organic peroxide is any mono-peroxide selected from t-butylperoxy 2-ethylhexyl carbonate, t-hexylperoxy isopropyl monocarbonate, t-butylperoxy isopropyl monocarbonate, t-hexylperoxy benzoate, dibenzoyl peroxide, di(4-methylbenzoyl) peroxide, diisopropylperoxy dicarbonate, and t-butylperoxy benzoate.

7. An expanded resin-made container obtained by thermally molding the polypropylene-based resin expanded sheet according to claim 4.

* * * * *